Figure 1:
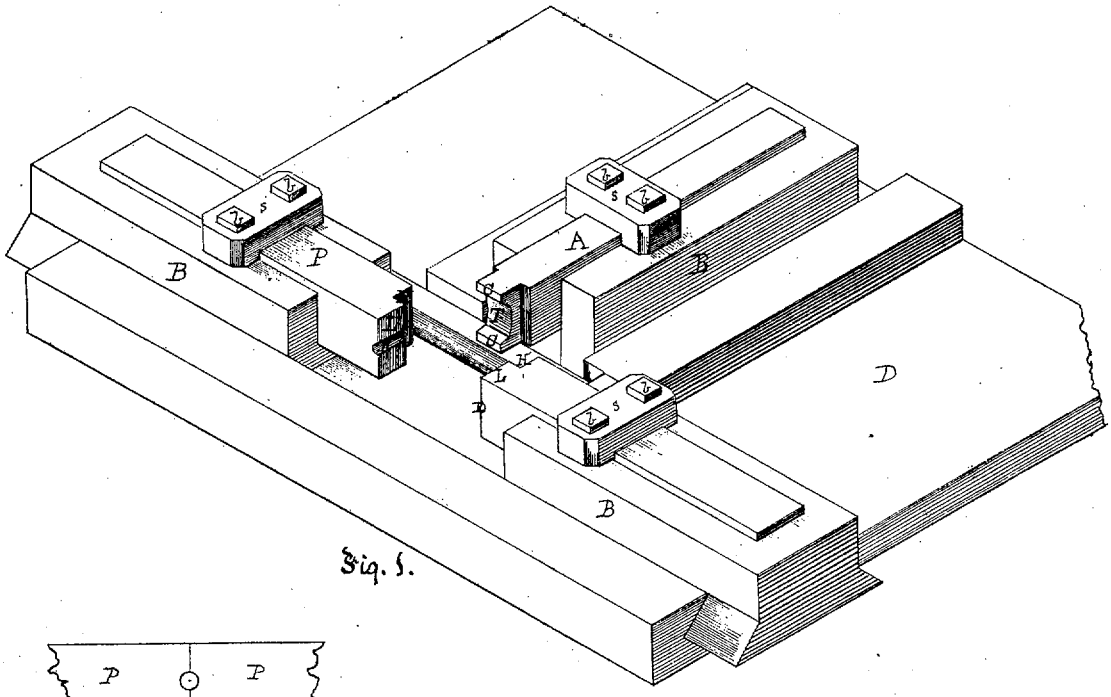

W. J. Lewis,
Bolt Mach.

No. 3743. Reissued Nov. 23, 1869.

Witnesses:
R. O. Wrenshall
Thos. B. Kerr

Inventor:
William J. Lewis,
by Bakewell, Lehnsly,
his Attys.

UNITED STATES PATENT OFFICE.

WILLIAM J. LEWIS, OF PITTSBURG, PENNSYLVANIA.

IMPROVED BOLT-MAKING MACHINE.

Specification forming part of Letters Patent No. 41,929, dated March 15, 1864; Reissue No. 3,251, dated January 5, 1869; Reissue No. 3,743, dated November 23, 1869.

*To all whom it may concern:*

Be it known that I, WILLIAM J. LEWIS, of Pittsburg, in the county of Allegheny and State of Pennsylvania, have invented a new and useful Improvement in Bolt-Making Machines; and I do hereby declare the following to be a full, clear, and exact description thereof.

Previous to the date of my invention square-headed bolts were made by upsetting a portion of the end of an iron rod, and then swaging such upset portion to the shape required by the action of a series of square-faced dies, each pair of dies operating successively and alternately on the opposite sides or faces of the bolt-head. As an improvement on this mode of manufacture, griping-dies were made, having, when the dies were together, a recess or matrix of the size in cross-section of the bolt-head to be made. The depth of such recesses was in some cases equal to the thickness of the bolt-head desired, and then the heading-tool worked up to and covered the only open side of the matrix, and so swaged up a head. In other cases the depth of the recesses was greater than the thickness of the head to be made, and then the heading or upsetting tool, being made of the proper size, entered the recess and so formed the head. In both modes a flash or fin was sure to be formed on the bolt-head, not only along the joint or part of the griping-dies, but also around the top of the bolt-head—in the former case extending out laterally from the head, and in the latter case making a cup-shaped cavity on the top of the head. The pin thus formed was then removed, and the head finished up by hand or by the use of other mechanical appliances. The same difficulty existed in another class of machines, in which the matrix for the bolt-head was made in the heading-die, the fin in that case extending out laterally around the base of the bolt-head. In connection with such modes of manufacture, the efforts of manufacturers were chiefly directed to making dies with joints so perfect that no flash or fin would be formed and the feature of my invention by which it is particularly distinguishable from any previously made is that instead of seeking to avoid the formation of a flash or fin, which it has thus far been found impossible to do, I not only do not endeavor to prevent their formation, but I also purposely allow the metal designed for the head to spread freely outward beyond the line or plane of finish of the complete head at one or more open sides of the matrix or die-box, in order that by turning the bolt-blank one-fourth part of a revolution after each or any impact of the heading-tool the fin or metal which by the previous impact of said tool had been spread and forced out beyond the line of finish of the complete head will be brought opposite the solid face or faces of one or both of the griping-dies and be forced back by them into the body of the head by their next succeeding motion.

The nature of my invention consists, first, in an improved method of forming bolt-heads by upsetting the end of the bolt rod or blank against the faces of a pair of griping-dies and into a cavity formed therein of a breadth in one direction equal to the breadth of the finished bolt-head, but open on one or both the other sides to permit the free exudation of the metal beyond the line or plane of finish of the complete head, and after each impact of the heading-tool turning the blank one-fourth of a revolution in order that the metal so forced out beyond the line of finish by the operation of the header may be forced back into the body of the head by the next succeeding operation of the griping-dies; second, in the combination of a heading or upsetting tool the working-face of which is longer than it is broad with a pair of griping-dies which, when closed together, form a matrix or working-cavity of the same width as the bolt-head to be formed therein, and of a length at least equal to the length of the working-face of the heading-tool, the combination being such and operating conjointly in the manner hereinafter set forth; third, in an improved construction and arrangement of bolt-heading dies.

To enable others skilled in the art to make and use my invention, I will proceed to describe its construction and mode of operation, referring for that purpose to the accompanying drawings, making a part of this specification, in which—

Figure 3:
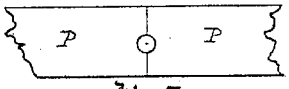
Figure 4:
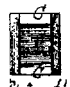
Figure 2:
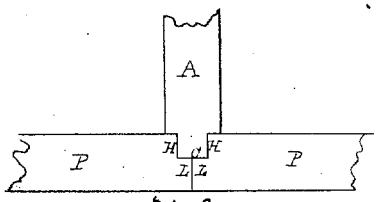
Figure 6:
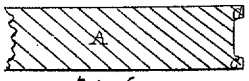
Figure 7:
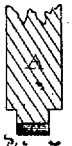
Figure 5:
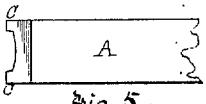

Figure 1 is a perspective view of my improvement in dies for bolt-machines. Fig. 2 represents a top or plan view of the working ends of the dies closed up as when in the act of forming the head. Fig. 3 is a front view of the griping-dies in position as when holding the bolt. Fig. 4 represents an end view or face of a header provided with cheeks. Fig. 5 is a side view of the same. Fig. 6 is a longitudinal vertical section. Fig. 7 is a horizontal section of Fig. 4.

All the drawings are lettered, and similar letters denote corresponding parts in the several views.

I construct the parts for operating the dies of my machine in any of the well-known ways; but in this case, for the purpose of making the dies work smoothly and evenly, I have formed a table, D, in which the boxes B B B slide in dovetailed grooves made therein for that purpose. These boxes are open at the top and front end. The dies, being placed in, are secured by clamps *s s s*, held down by screws *b b b b b b*.

On the converging or front ends, L L, of the griping-dies P P is cut a semicircular groove, R, for the purpose of catching the rod of iron from which the bolt is formed. Just back of this, and on the side next the heading-die and in each of the griping-dies, I have made a recess, H, half the width and somewhat more than the full depth of the head of the bolt. Directly behind the dies, and working at right angles thereto, is the heading-die A, secured and worked in the same manner and with a motion similar to the other dies. The face T of this die or header is wide enough to fill the space or recess formed in the griping-dies, as seen at Fig. 2, and is somewhat longer than it is wide.

Projecting from the face T of the header A are a couple of cheeks, C C, the distance between the bases of which is a little in excess of the breadth of the working-face of the header, and the inner faces of which are beveled outward toward their outer end, as shown, whereby, when all the dies are closed together, room (more or less, as may be preferred) is left on two sides of the matrix for the exudation or flow of the metal of the bolt-head beyond its line of finish; but in securing this end it is obvious that the cheeks C C may be more widely separated, and that the mechanical operation of the machine in swaging the bolt-head will be the same if one or both of them be dispensed with, since the surplus metal in either case will at the upsetting of the rod pass out beyond the line of finish on two sides. It will also be observed that in this construction the forward ends of the griping-dies P P are so shaped that when closed together they give a recess or cavity longer than it is broad, or, in other words, narrower in the direction of the length of the dies than it is in a direction at right angles thereto, and parallel to the working-face of the heading-tool; also, that the length of the working-face of the header A is longer than it is broad, its breadth, as already stated, being equal to the breadth of the cavity of the griping-dies when the latter are closed. At the same time that the metal exudes beyond the line of finish of the bolt-heads in the direction of the longest dimension of the matrix and in a direction at right angles to the direction of the stroke of the griping-dies a flash or fin is liable to be formed along the joints or parts of the three dies. Then, at a subsequent stroke of the dies, by turning the bolt one-fourth way around the dies will work in that portion of the iron which was forced out, thereby forming a square head on the bolt, free from any flash or fin.

The iron from which it is intended to form the bolt, being of the size required to make the shank, is inserted between the griping-dies P P, where it is held, on their approach, in the groove R. Sufficient amount, however, of the rod of iron to form the head is allowed to extend through toward the header, when it, by its motion in the direction of the griping-dies, staves the projecting iron between itself and the dies, holding it until the iron is made to fill the recess left for the formation of the head of the bolt. A portion of the surplus metal, however, is forced out between the dies, beyond the line of finish of the perfect head. When the dies open to make another stroke the partly-formed bolt is turned one-fourth way round by the operator, so as to bring the fin produced by the first stroke of the machine directly opposite the solid portion of the dies, whereby the surplus metal is driven into the body of the iron, making a perfectly-smooth and well-shaped head without further labor, though, if necessary, the operation can be repeated till all the surplus metal is worked in.

The construction and arrangement of two griping-dies and a heading-die, as above set forth, secure one important result—viz., that no matter on what part of the bolt-head at any stage of its manufacture a flash, fin, or excess of metal may be caused to exude beyond the line or plane of finish of the complete head, the turning of the bolt or bolt-blank one-fourth of a revolution when the dies recede will bring such flash, fin, or excess of metal opposite to the solid face or faces of some one or more of the dies, there to be acted on and forced into the body of the head at the next stroke.

It will also be observed that in the formation of the bolt-head the griping-dies and heading-tool operate conjointly, the griping-dies first coming together, grasping the rod or bolt shank and holding it until the heading-die makes its stroke and upsets or swages the iron into the matrix or cavity of the griping-dies.

What I claim as my invention, and desire to secure by Letters Patent, is—

1. As a new and improved method of forming bolt-heads, upsetting, by means of a reciprocating heading-tool, the end of the bolt-blank against the faces of the griping-dies and into a cavity formed therein of a breadth in one direction equal to the breadth of the finished head, but open on one or both the other sides to permit the exudation of the metal, and after each impact of the heading-tool turning the blank one-fourth of a revolution, in order that the metal forced beyond the line of finish by the operation of the header may be forced back into the body of the head by the next succeeding operation of the dies, substantially as described.

2. The combination of a heading or upsetting tool the working-face of which is longer than it is broad with a pair of griping-dies which when closed, form a working cavity of the same width as the bolt-head to be formed therein, and of a length at least equal to the length of the working-face of the heading-tool, the combination being substantially such as and operating conjointly in the manner described, and for the purposes set forth.

3. The construction and arrangement, in a bolt-heading machine, of three dies, substantially in the manner and for the purposes set forth.

In witness whereof I, the said WILLIAM J. LEWIS, have hereunto set my hand.

WILLIAM J. LEWIS.

Witnesses:

G. H. CHRISTY,

A. S. NICHOLSON.